United States Patent
Wang et al.

(10) Patent No.: US 8,336,044 B2
(45) Date of Patent: *Dec. 18, 2012

(54) METHOD AND SYSTEM FOR DEPLOYING A SOFTWARE IMAGE

(75) Inventors: Frank C. Wang, Boca Raton, FL (US); Scott D. Aiken, Boca Raton, FL (US); Juliano Maldaner, Delray Beach, FL (US); Dennis E. Kelly, Boca Raton, FL (US); Michael S. Goldflam, Wake Forest, NC (US)

(73) Assignee: RPX Corporation, San Francisco, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/213,503

(22) Filed: Aug. 26, 2005

(65) Prior Publication Data

US 2007/0046791 A1  Mar. 1, 2007

Related U.S. Application Data

(63) Continuation-in-part of application No. 10/267,492, filed on Oct. 9, 2002, now Pat. No. 7,024,581.

(51) Int. Cl.
*G06F 9/445* (2006.01)
*G06F 9/44* (2006.01)

(52) U.S. Cl. ........ 717/174; 717/175; 717/177; 717/168; 717/169; 717/172

(58) Field of Classification Search ................ 717/174, 717/175, 177, 168, 169, 172; 713/1, 2, 100
See application file for complete search history.

(56) References Cited

U.S. PATENT DOCUMENTS

| | | | |
|---|---|---|---|
| 5,212,784 A | 5/1993 | Sparks | |
| 5,379,342 A * | 1/1995 | Arnold et al. | 713/2 |
| 5,469,573 A | 11/1995 | McGills et al. | |
| 5,537,540 A | 7/1996 | Miller et al. | |
| 5,644,698 A | 7/1997 | Cannon | |
| 5,675,769 A | 10/1997 | Ruff et al. | 713/2 |
| 5,708,776 A | 1/1998 | Kikinis | |
| 5,745,672 A | 4/1998 | Stiffler | |
| 5,764,593 A | 6/1998 | Turpin et al. | |
| 5,778,395 A | 7/1998 | Whiting et al. | 707/204 |
| 5,790,773 A | 8/1998 | Dekoning et al. | |
| 5,829,045 A | 10/1998 | Motoyama | |
| 5,852,713 A | 12/1998 | Shannon | |
| 5,857,208 A | 1/1999 | Ofek | |
| 5,860,124 A * | 1/1999 | Matthews et al. | 711/165 |

(Continued)

OTHER PUBLICATIONS

Goel, et al. "The Taser Intrusion Recovery System", 2005, ACM, p. 163-176.*

(Continued)

*Primary Examiner* — Qamrun Nahar
(74) *Attorney, Agent, or Firm* — Berkeley Law & Technology Group, LLP

(57) ABSTRACT

A method and system for efficiently deploying (also sometimes referred to as distributing and/or installing) a computer device's software image using a single portable image using an alternate partition for loading the image on the storage (hard drive) along with selected patches chosen for the configuration of the computer. The single image is processed using delta image patching technology to allow the single image to be customized and operable (work on) the particular computer, where the single portable image is adapted to operate on a large number of diverse computer device platforms.

19 Claims, 5 Drawing Sheets

U.S. PATENT DOCUMENTS

| | | | |
|---|---|---|---|
| 5,907,672 A | 5/1999 | Matze et al. ............ 714/8 |
| 6,047,294 A | 4/2000 | Deshayes et al. |
| 6,061,770 A | 5/2000 | Franklin ............ 711/162 |
| 6,073,220 A | 6/2000 | Gunderson |
| 6,081,879 A | 6/2000 | Arnott |
| 6,138,179 A | 10/2000 | Chrabasz et al. |
| 6,167,494 A | 12/2000 | Cheston et al. |
| 6,167,532 A | 12/2000 | Wisecup |
| 6,173,291 B1 | 1/2001 | Jenevein |
| 6,175,904 B1 | 1/2001 | Gunderson |
| 6,178,503 B1 | 1/2001 | Madden et al. |
| 6,192,488 B1 | 2/2001 | Li |
| 6,205,527 B1 | 3/2001 | Goshey et al. |
| 6,205,558 B1 | 3/2001 | Sobel |
| 6,216,211 B1 | 4/2001 | McBrearty et al. |
| 6,253,300 B1 | 6/2001 | Lawrence et al. ............ 711/173 |
| 6,281,894 B1 | 8/2001 | Rive |
| 6,289,426 B1 | 9/2001 | Maffezzoni et al. |
| 6,374,363 B1 | 4/2002 | Wu et al. ............ 714/6 |
| 6,378,054 B1 | 4/2002 | Karasudani et al. ............ 711/204 |
| 6,385,707 B1 | 5/2002 | Maffezzoni |
| 6,385,721 B1 | 5/2002 | Puckette |
| 6,392,984 B2 | 5/2002 | Mori et al. ............ 369/275.3 |
| 6,393,560 B1 | 5/2002 | Merrill et al. |
| 6,438,749 B1 | 8/2002 | Chamberlain ............ 717/174 |
| 6,442,067 B1 | 8/2002 | Chawla |
| 6,460,054 B1 | 10/2002 | Grummon ............ 707/204 |
| 6,477,629 B1 | 11/2002 | Goshey et al. |
| 6,490,722 B1 | 12/2002 | Barton et al. |
| 6,519,762 B1 | 2/2003 | Colligan et al. |
| 6,532,535 B1 | 3/2003 | Maffezzoni et al. |
| 6,557,169 B1 | 4/2003 | Erpeldingerl |
| 6,560,703 B1 | 5/2003 | Goodman |
| 6,587,970 B1 | 7/2003 | Wang et al. ............ 717/47 |
| 6,591,376 B1 | 7/2003 | VanRooven et al. |
| 6,594,743 B1 | 7/2003 | Chen et al. ............ 711/162 |
| 6,594,822 B1 | 7/2003 | Schweitz et al. ............ 717/140 |
| 6,615,365 B1 | 9/2003 | Jenevein et al. ............ 714/6 |
| 6,629,110 B2 | 9/2003 | Cane et al. ............ 707/204 |
| 6,647,399 B2 | 11/2003 | Zaremba ............ 707/202 |
| 6,654,906 B1 | 11/2003 | Arndt |
| 6,658,435 B1 | 12/2003 | Mccall ............ 707/204 |
| 6,658,591 B1 | 12/2003 | Arndt |
| 6,671,705 B1 | 12/2003 | Dupery et al. ............ 707/204 |
| 6,684,229 B1 | 1/2004 | Luong |
| 6,701,356 B1 | 3/2004 | Condict et al. ............ 709/220 |
| 6,711,660 B1 | 3/2004 | Milne et al. ............ 711/173 |
| 6,718,466 B1 | 4/2004 | Duwe et al. |
| 6,748,553 B2 | 6/2004 | McBride et al. |
| 6,754,855 B1 | 6/2004 | Denninghoff et al. |
| 6,763,458 B1 | 7/2004 | Watanabe et al. ............ 713/100 |
| 6,807,630 B2 | 10/2004 | Lay |
| 6,845,464 B2 | 1/2005 | Gold |
| 6,851,073 B1 | 2/2005 | Cabrera et al. |
| 6,859,925 B2 | 2/2005 | Lin |
| 6,862,681 B2 | 3/2005 | Cheston et al. |
| 6,880,101 B2 | 4/2005 | Golasky et al. |
| 6,901,493 B1 | 5/2005 | Maffezzoni |
| 6,910,151 B2 | 6/2005 | Gin et al. ............ 714/6 |
| 6,928,579 B2 | 8/2005 | Aija et al. |
| 6,931,522 B1 | 8/2005 | Raghavan et al. |
| 6,934,722 B1 | 8/2005 | Goshey et al. |
| 6,934,881 B2 * | 8/2005 | Gold et al. ............ 714/15 |
| 6,948,099 B1 | 9/2005 | Tallam |
| 6,957,362 B2 | 10/2005 | Armangau ............ 714/20 |
| 6,963,951 B2 | 11/2005 | Ng et al. |
| 6,963,981 B1 | 11/2005 | Bailey et al. ............ 726/22 |
| 6,993,642 B2 | 1/2006 | Burkhardt et al. ............ 713/1 |
| 6,996,706 B1 | 2/2006 | Madden et al. ............ 713/2 |
| 6,996,828 B1 | 2/2006 | Kimura et al. ............ 719/319 |
| 7,000,231 B1 | 2/2006 | Gold |
| 7,024,581 B1 * | 4/2006 | Wang et al. ............ 717/168 |
| 7,032,177 B2 | 4/2006 | Novak et al. ............ 715/723 |
| 7,096,330 B1 | 8/2006 | Root et al. ............ 711/162 |
| 7,124,322 B1 | 10/2006 | Backman |
| 7,203,804 B2 * | 4/2007 | Kawano et al. ............ 711/162 |
| 7,216,251 B2 | 5/2007 | Gaunt et al. |
| 7,254,682 B1 | 8/2007 | Arbon ............ 711/161 |
| 7,287,249 B2 | 10/2007 | Coyle ............ 717/168 |
| 7,287,250 B2 * | 10/2007 | Liles et al. ............ 717/174 |
| 7,310,653 B2 | 12/2007 | Coyle et al. ............ 707/203 |
| 7,356,679 B1 * | 4/2008 | Le et al. ............ 717/176 |
| 7,409,685 B2 | 8/2008 | Chen et al. ............ 717/170 |
| 7,430,686 B1 * | 9/2008 | Wang et al. ............ 717/174 |
| 2002/0059498 A1 | 5/2002 | Ng et al. |
| 2002/0083362 A1 | 6/2002 | Semo et al. |
| 2003/0012114 A1 | 1/2003 | Larvoire et al. |
| 2003/0023839 A1 | 1/2003 | Burkhardt et al. ............ 713/1 |
| 2003/0200480 A1 | 10/2003 | Beattie |
| 2006/0085686 A1 * | 4/2006 | Cheston et al. ............ 714/38 |
| 2006/0271819 A1 | 11/2006 | Cluff et al. |

OTHER PUBLICATIONS

Nieh, et al. "Experiences Teaching Operating Systems Using Virtual Platforms and Linux", 2005, ACM, p. 520-524.*

* cited by examiner

METHOD AND SYSTEM FOR DEPLOYING A SOFTWARE IMAGE

CROSS REFERENCE TO RELATED PATENTS

The present invention is a continuation-in-part of previously-filed and currently patent application entitled "Data Processing Recovery System and Method Spanning Multiple Operating Systems" filed Oct. 9, 2002 as Ser. No. 10/267,492 now Pat. No. 7,024,581 by inventors Frank C. Wang et al.

The present invention is also related to a concurrently-filed patent application (Ser.No. 11/213,502 filed Aug. 26, 2005) entitled "Method and System for Updating a Software Image" filed by the same inventors. The specification of this related patent, which is sometimes referred to herein as the Image Update Patent, is expressly incorporated herein by reference.

FIELD OF THE INVENTION

This invention relates generally to a personal computer (sometimes referred to as a PC), traditional server or blade server that runs its operating system and software applications from its local storage (hard disk), or SAN or NAS attached storage) where the software image needs to be installed initially to get the device functioning. For simplicity, we will generically refer to both traditional and blade servers in addition to workstations as PC's or personal computers. More particularly, the present invention relates to a method and system for reducing the complexity and cost of installing the initial software image (or a replacement image) by using an "image delta" technology to reduce the number of images required for a plurality of PCs and to simplify the process of installing the initial software image in the computer.

BACKGROUND OF THE INVENTION

Most computer devices such as personal computers have a software image in a local storage medium, such as a hard disk, that includes the base operating system and applications required to run the device. The Rapid Restore Patent discloses one method for quickly and easily restoring a computer to a previous version, for example, after its image has been corrupted. However, this patent does not address a way of providing an initial image onto a machine, particularly when there are various types of computers and various models of them onto which an image is to be loaded.

Installing an operating system today provides a limited set of configuration options during installation time. In addition, it does not provide the installation of third party software. Due to these limitations, there are two common methods of installation of an initial image that exist in prior art. One is to use silent installations, where each device goes through an unattended installation of the operating system and applications, and cloning, where a single copy of the operating system and applications is applied to multiple devices of identical type. It is also common to use a hybrid of these techniques where the initial base operating system is applied with cloning and the applications are applied through silent installs.

The current processes each have downsides related to image integrity. In the use of silent installs, it is difficult to ensure consistent image integrity and versioning. In the use of cloning, an image is tied to a single device type. If several model machines are being utilized, then it is necessary to have an image for each model machine, again introducing a challenge to maintain image integrity between device types for security settings, Operating System configuration, application versions and configuration.

There are extensive costs associated with an image lifecycle. This starts with multiple image creation efforts to support multiple device types. It is common to have thousands of settings required to be set to have an image comply with corporate policies. This is then compounded by the requirement to perform packaging, Quality Assurance and Integration testing and security for each variation of an image in production.

The current invention is designed to remove the initial issues with image integrity, while helping to reduce costs related to ongoing image maintenance. It does this by allowing an image to be created one time and to be utilized across multiple device types. By using an image versus unattended install, it removes the controls required to maintain appropriate versioning and final image integrity. In addition, by now allowing a cloned image to be used across multiple device types, it also removes the risk to image integrity by having to set thousands of settings for each image and risking having a variance on a setting between images. The current invention allows an image to be created a single time, with the appropriate Operating System configuration, Security Settings, and applications ensuring that the settings will remain consistent across the machines within the enterprise. This reduces the complexity and costs associated with the previously stated image lifecycle management of multiple efforts related to packaging, Quality Assurance and Integration testing and security for each variation of an image in production.

Other limitations and disadvantages of the systems and methods of the prior art will be apparent to those of ordinary skill in the art in view of the following summary of the invention taken together with the description of the preferred embodiment and the accompanying drawings.

SUMMARY OF THE INVENTION

The disclosed technique overcomes the above limitations of deploying software images by using image and file delta technology to deploy and customize a software image on a computer system. The present invention uses a secure partition on the local storage medium to store an alternate operating system, as well as some combination of software images, and image patches. Please note that the secure partition can be created as part of the installation process. This secure partition is used in conjunction with delta patch technology to minimize the number of software images required in an organization. The present invention allows the use of a single common image for the operation of a variety of different computer systems.

The present invention also allows for the customization of an operating system and other programs to the particular hardware configuration of the machine on which it is being installed. That is, the common image is useful on different types of hardware, and the user does not have to search for and find an image which is especially suited for his configuration.

The present invention is also useful when a new image is being deployed to a computer, to replace the image that is presently in use on the computer. For example, if a new operating system is being deployed, it may be desired to provide a complete image to provide more uniformity in the contents of each computer by replacing the entire image.

The present invention uses one or more selected patches to customize a common image to customize the image to work on the computer on which it is being installed.

The present invention has the advantage that the computer need not have an installed operating system as the image includes an auxiliary operating system. That image, including the auxiliary operating system, is installed in one partition of the computer by either booting a CD\DVD or other local media or remotely from the network and allows for the customization of the common image using one or more selected patches chosen for the configuration of the computer.

The present invention has the advantage that the computer configuration is determined at the time the image is being installed. That determination may be an automatic determination (as when the auxiliary operation system runs a script to determine the configuration of the computer) or by an entry from a user in which the configuration information is provided. In any event, the correct patch(es) is determined in response to the configuration information and used to customize the common image, using the auxiliary operating system in at least one embodiment of the present invention. In another embodiment of the present invention, the patches are applied to the common image remote from the computer and supplied for loading on the computer, either through a network connection or through a removable media, which includes the customized image.

Minimizing the number of deployed images is the first step in reducing the complexity, cost and error rate of deploying (and updating) software images. With fewer base images, there is less testing required to confirm software updates will work on all system images. To reduce the number of required images, the present invention dynamically patches a software image with the appropriate delta files to allow a single common software image to be adapted to work on many different device types. These delta files typically include hardware specific drivers, but can also include other files, such as application files. This first method uses an alternate operating system running in local secure partition within a device to recover the common operating system image to one or more primary partitions. Before starting this common operating system, the present invention patches any number of files within the primary operating system while still running from the alternate operating system. The patching is performed based on an administrator specified configuration file. The configuration file indicates which delta files need to be patched based on system information including the device manufacturer and the device model. The delta patch files and configuration file are stored in the local secure partition.

It should also be appreciated by those skilled in the art that other objects and advantages are accomplished by the present invention, and the foregoing list of features and advantageous effects is illustrative but not exhaustive.

BRIEF DESCRIPTION OF THE DRAWINGS

Other objects and advantages of the present invention will be apparent to those of ordinary skill in the art from the detailed description that follows along with the accompanying drawings, wherein.

DETAILED DESCRIPTION OF A PREFERRED EMBODIMENT

The first step in the operation of any computer is to get a software image deployed onto the computer. In the case of the present invention, this involves deploying a common image to a diverse set of computer devices and customizing the image to each device so that it is fully operational in the environment in which it is deployed. That customized image is produced by applying one or more patches to a common image, with the patches being selected based on the configuration of the computer device onto which the image is being installed.

Figure 1:
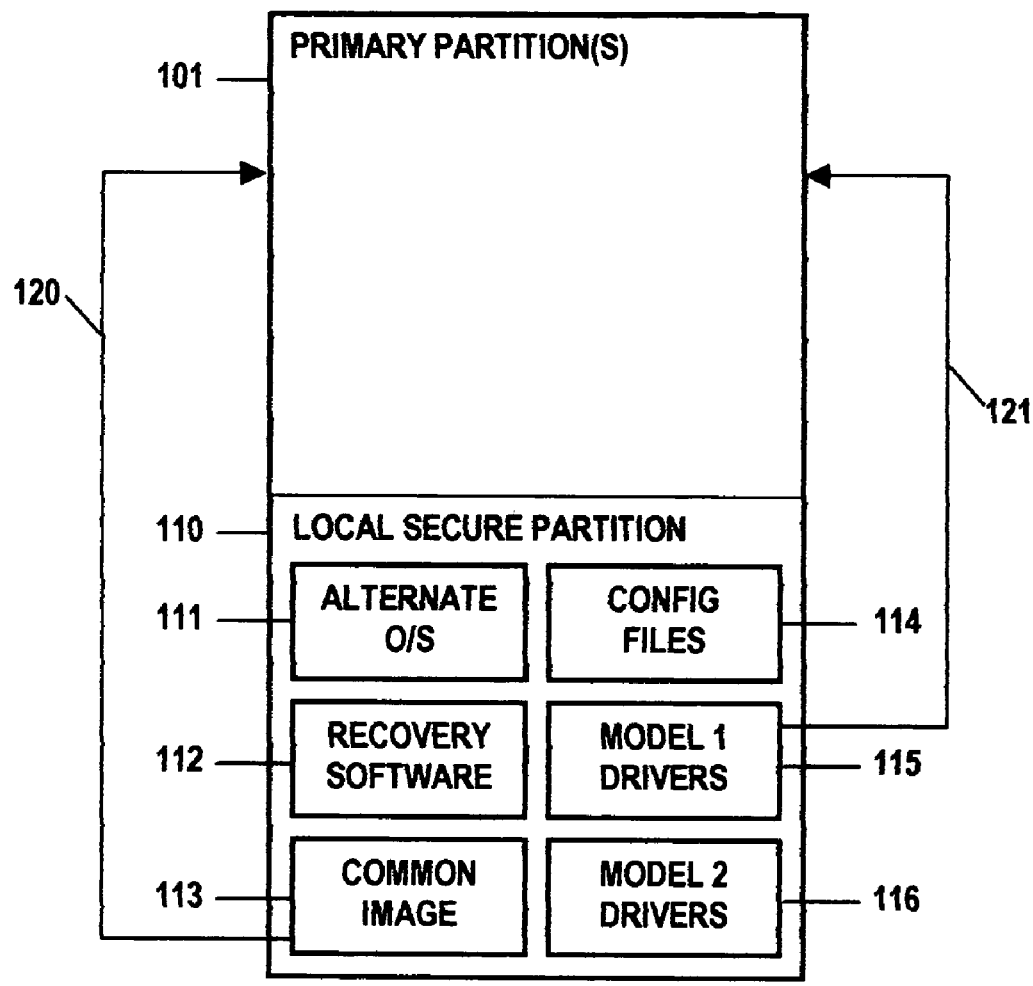
FIG. 1 illustrates a personal computer that employs a primary partition and a second partition on a hard disk to install from a common image and patches (or drivers) that are part of an installation package and loaded within the second partition (a secure local secure partition)

FIG. 1 illustrates the layout of a computer device hard disk in its operational configuration, with two partitions, one being a primary partition and the other a secure, local partition used by the invention to deploy a single portable operating system image. A primary partition 101 contains a main operating system, applications and data files required to run the computer device. The primary partition 101 is used while the computer device (the PC) is performing its normal operations from the primary operating system. In a preferred embodiment of the invention, the primary partition 101 was created from local secure partition 110 when the computer device image is first created or the device is recovered back to its original image. The computer device is booted from alternate operating system 111 which, in turn, runs recovery software 112. Recovery software 112 first creates primary partition 101 and all of its contents using common image 113, as show by an arrow 120. Common image 113 is used on many different types of computer devices, such as devices from different vendors and devices of different classes, such as a laptop device and a desktop device. Common image 113 will not run from the primary operating system properly on all of the computer devices until it is properly patched with files unique to the device type. After applying common image 113, recovery software 112 determines what files in the primary partition 101 to patch by determining the hardware type of the computer device (which includes determining the hardware manufacturer and model and parsing configuration files 114 to determine the files to patch based on this hardware manufacturer and model information). Model 1 drivers (or patches) 115 contain the files that need to be patched for a first manufacturer and model combination while model 2 drivers (or patches) 116 contain the files that need to be patches for a second manufacturer and model combination. Recovery software 112 patches the files from the appropriate driver set (show as the model 1 drivers 115 with an arrow 121 from the local secure partition 110 in FIG. 1) into the primary partition 101 for each device that requires its primary partition to be created for the first time or requires its primary partition to be recovered. Once recovery software 112 completes the patch process, recovery software 112 reboots out of alternate operating system 111 and into primary partition 101 where the primary operating system starts to run.

It may be appropriate to explain some of the terminology used in this document to provide a better understanding of the system and process. An "image" (including the common image) is the software data, operating system and applications that are loaded onto a computer, often in a format that allows for the software to adapt (or to be adapted) to one of several hardware configurations. This image is not related to a photographic or other graphic image except that the software image and a photographic image may each be represented by 1's and 0's within the memory of a digital computer. The "common image" is the base image from which changes or patches are applied to provide a customized and usable image at a particular workstation or computer. Such a common image (which can be adapted later, if desired) may be created by a Microsoft tool called "sysprep". The base or common image is the foundation for the present system and method in providing a base set of software and data and may be considered a collection of sectors when it is stored in a computer memory. A "secure partition" might be considered a region of storage where there is either hardware or software which "protects" the content by making it difficult for an authorized agent (whether a user or software) to make changes to the content or which allows for the detection of any unauthorized changes to the content, and many methods of securing a partition or memory are known in the art. Given the many known ways to secure a partition, the present invention is not particularly dependent on any particular securing technique. The present description also refers to "sectors" which are the basic unit of storage on a disk or other storage device, each of which sectors is typically 512 bytes for a PC-type device, although the storage units may be of any predetermined size and the present invention is not particularly dependent on the size of the sector.

Figure 2:
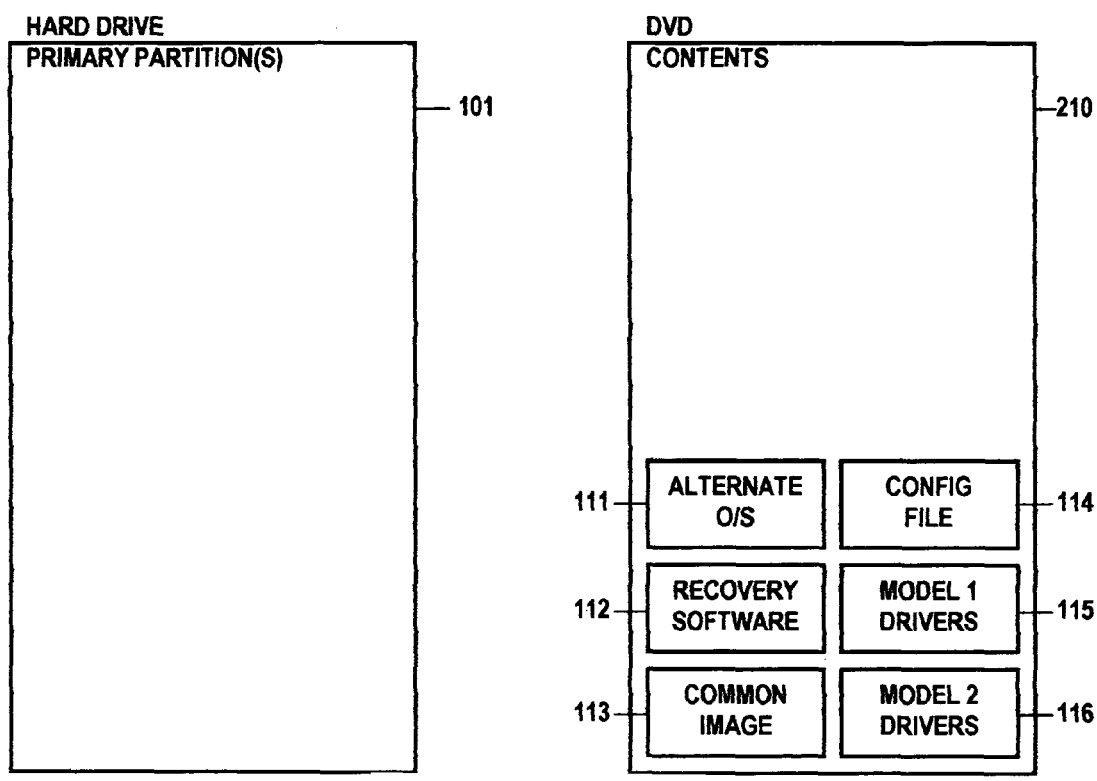
FIG. 2 illustrates the personal computer using a method and system of using the installation package that contains a single portable image to provide the necessary patches for establishing a customized image on the primary partition in the personal computer.

FIG. 2 shows a second method for the current system to deploy a single portable operating system image by using an external medium such as a DVD or CD, instead of using a local partition. The primary partition 201 on the personal computer device hard drive is created, along with its contents, from DVD 210. The creation process starts by booting the computer device using a DVD 210. The DVD 210 starts the alternate operating system 111, which, in turns, runs the recovery software 112. The recovery software 112 first creates the primary partition 101 on the hard drive and all of its contents from the common image 113 that is contained on the DVD 210. After applying the common image 113, the recovery software 112 patches the files in the primary partition 101 with the files in the appropriate driver set (either model 1 drivers 115 or the model 2 drivers 116). Once the recovery software 112 completes the patch process, the recovery software 112 boots using the alternate operating system 111 and into primary partition 101 on the hard drive.

Figure 3:
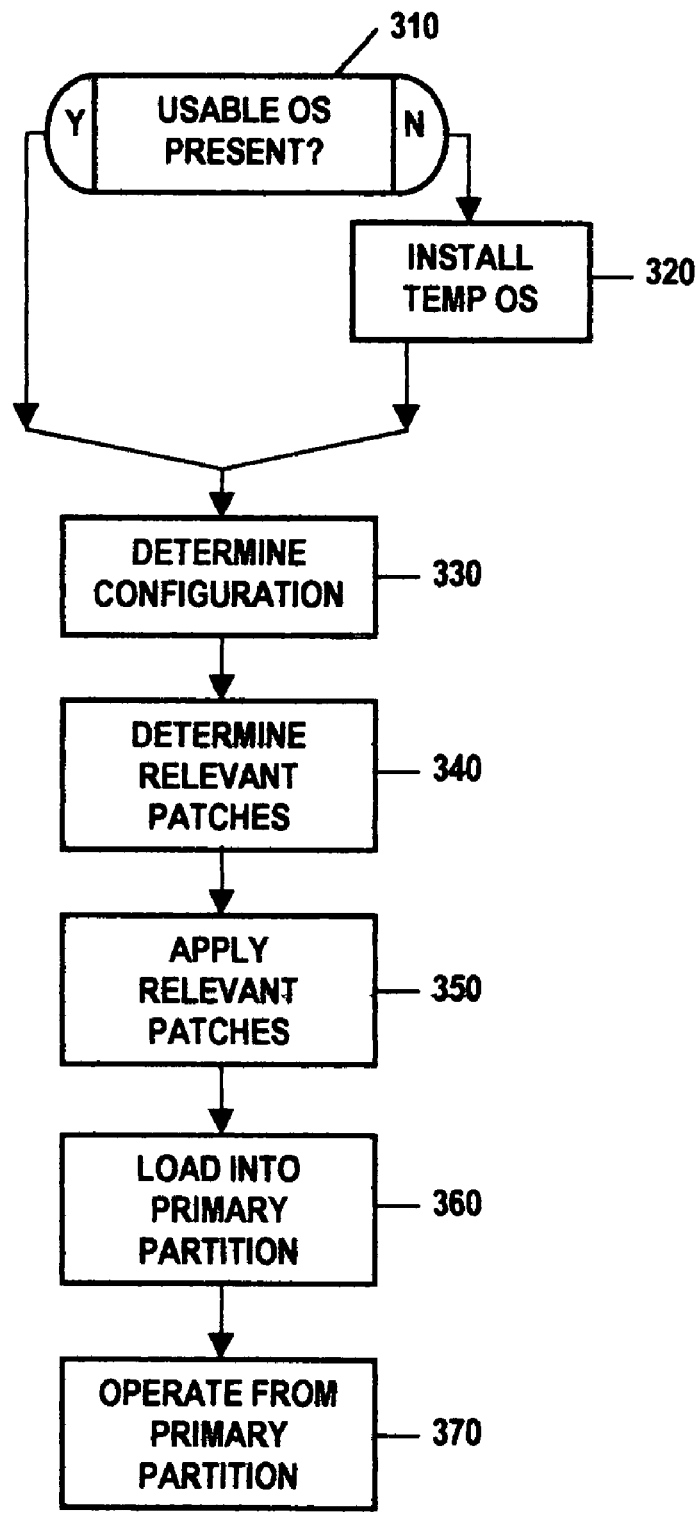
FIG. 3 is a flowchart that illustrates the steps of the present method for installing an image on a personal computer.

FIG. 3 illustrates a flow chart for one method of practicing the present invention for installing an initial load on a personal computer or other system. Since the personal computer may have something usable installed already (such as an initial operating system), the first thing done at block 310 is to determine whether there is a usable operating system on the personal computer, either because it came with it or because a previous use had included the operating system. If the block 310 determines that there is a usable operating system, then it is used in a first partition for the remainder of the set up described below. If not, then at block 320 a temporary operating system is installed in the first partition. This temporary operating system, which might be a simple DOS (disk operating system) or a LINUX operating system, is preferably a universal operating system which works on a wide range of computer hardware, albeit with a limited set of functions. It may be provided from a CD or other media including with the common image, or it may be provided separately, as by way of a network connection (from a central server).

Once the target system has been provided with an operational operating system, the configuration of the system is determined at block 330. This determination of configuration can be through executing a program which determines the key parameters of the system, such as the make and model of the computer hardware as well as any other key features needed for determination of the correct patches, such as peripherals and options. Alternatively, the configuration information can be determined through any other effective method, such as a user filling out a questionnaire and selecting the appropriate attributes, a table which indicates what hardware is installed where, or a listing of what hardware is assigned to what user and then correlating the user name with the hardware, or some combination of techniques to determine the configuration of the system. For an example, one method (such as the address method)) might be used with another method (a configuration checking program) used to verify that the information was correct. Of course, then, a method must be established to deal with a conflict (what do you believe when one method yields a different answer that another method?) In such a case, either the results can be discarded or the results of the most reliable system can be used.

Once the configuration is determined at the block 330, then one (or more relevant) patch(es) for the common image is determined at block 340 and the determined one or more relevant patch(es) is applied at block 340. Then, the patched common image is loaded into the primary partition at block 360 and the operation moves to the primary partition thereafter at block 370.

Figure 4:
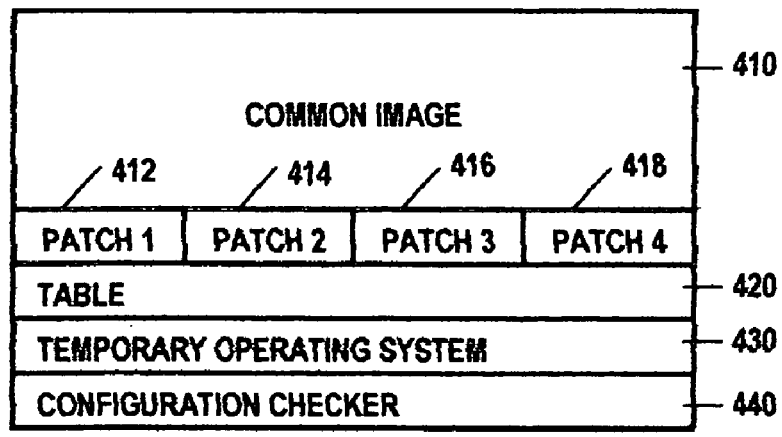
FIG. 4 shows a graphic illustration of the common image used in installing a customized operating image on a personal computer using the present invention.

FIG. 4 illustrates the contents of one example of a removable media useful for initialization of a target system in the present invention. This removable media might be in the form of a CD or other tangible device, or it might be a network communication of the equivalent data as packets of data (a sort of substitute or replacement for tangible media). In any event, the contents of the initialization include a common image 410 which represents the base information, including operating system, application programs, data and general settings for a system. The initialization materials also include a plurality of patches, identified here as patch1 412, patch2 414, patch3 416 and patch4 418, although any number of patches might be present, depending on the characteristics of the systems present. Also, present is a table 420 which indicates the relationship of the patches to the configurations determined. That is, it may indicate that patch1 412 is used when the system is an IBM ThinkPad Model T50 and patch2 414 is useful when the system is an IBM NetVista Model A50. Of course, the patches might be useful singularly or in combination, that is, there might be one patch for an IBM system in general, a second patch for an IBM ThinkPad and a third for an IBM NetVista desktop, depending on how the hardware features and the patches are arranged. The initialization image also includes a temporary operating system 430 as well as a configuration checker 440. Additional features of the initialization image could include security features (encryption), verification of installation, etc., as desired, features that are incidental to the main features of the present invention.

Figure 5:
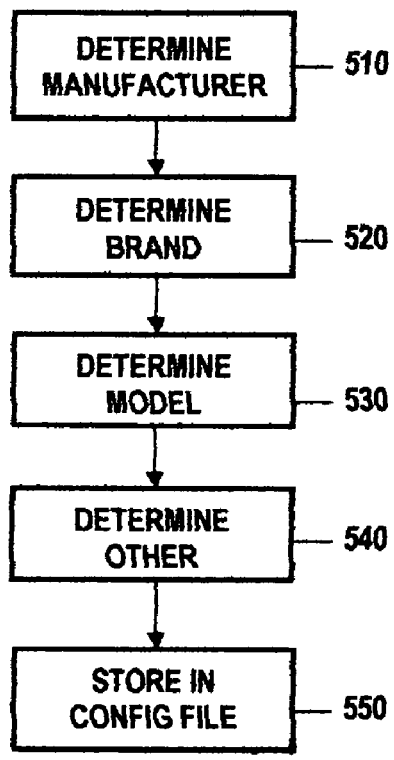
FIG. 5 shows the personal computer of FIG. 1 using a config utility to determine the configuration.

FIG. 5 illustrates a representative flowchart for the configuration-determining utility that has been described previously (which might be referred to as a configuration checker). Of course, the order in which the parameters are determined is not particularly relevant to the present invention, nor is the identity of the individual configuration elements. It is assumed that the image is to be installed on computing devices of different types and one (or more) patch(es) is associated with each of the allowed types of computing devices involved. So, the purpose of the process of FIG. 5 is to determine the type of computing device involved so that the proper patch(es) can be identified and used. Thus, the first step shown in FIG. 5 is to determine the manufacturer at step 510. It is well known that, while all computing devices may be identified as being of a common type (such as IBM-compatible) that there are differences which must be accounted for in the products from varying manufacturers or programs such as Windows XP, an operating system from Microsoft, simply will not load and run. A different adjustment is made to a program such as Windows XP for a personal computer manufactured by IBM from one which has been manufactured by Dell. Next, at step 520, the brand of computer is determined, for example, whether the computer is a NetVista personal computer or a ThinkPad, both of which are part of the IBM line of personal computers. Following this, at step 530, the model of product is determined, where the NetVista may have various models, such as A40 and A50. At step 540, any other parameters that should be determined are determined, such as size of the memory, presence of options and peripherals or other things that are relevant to the configuration (and the software being installed). At step 550 this determined information is stored into a config file for subsequent use in determining the patches needed. In the system described in connection with FIG. 4, the table 420 is used with the config file to determine the one or more patch(es) which are required for the configuration of the system.

Figure 6:
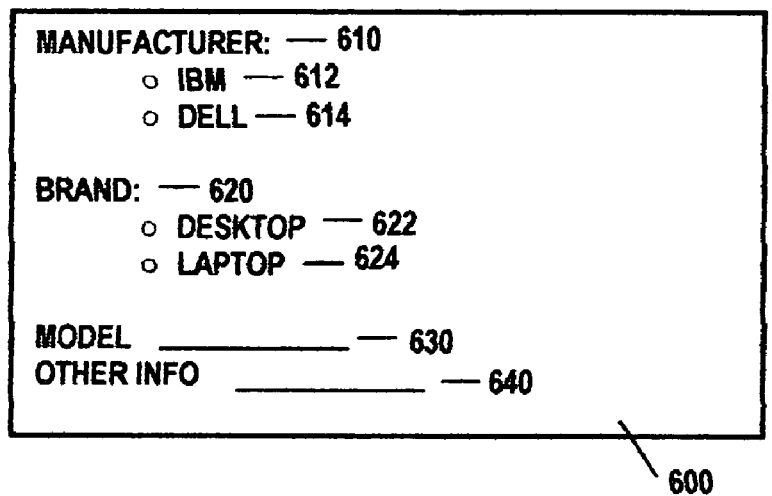
FIG. 6 depicts an alternative to the embodiment of FIG. 5 wherein the configuration of a personal computer is entered by a user.

FIG. 6 illustrates a user-completed questionnaire 600 that includes queries for the various aspects of configuration, a questionnaire which might be used in place of the configuration checker of FIG. 5. The questionnaire 600 includes a question 610 for the manufacturer with choices of IBM (at item 612) and Dell (at item 614), with other manufacturers added, depending on the allowed configurations (those systems which are supported by the present common image and patches). Next, the brand is completed by the user at item 620, in this case selecting from desktop at item 622 or laptop at item 624. Next, the model is completed, in this case by typing the model number into the blank at item 630. Finally, any additional information that may be needed to determine the patches (such as optional or peripheral equipment or similar information) is completed at item 640.

Figure 7:
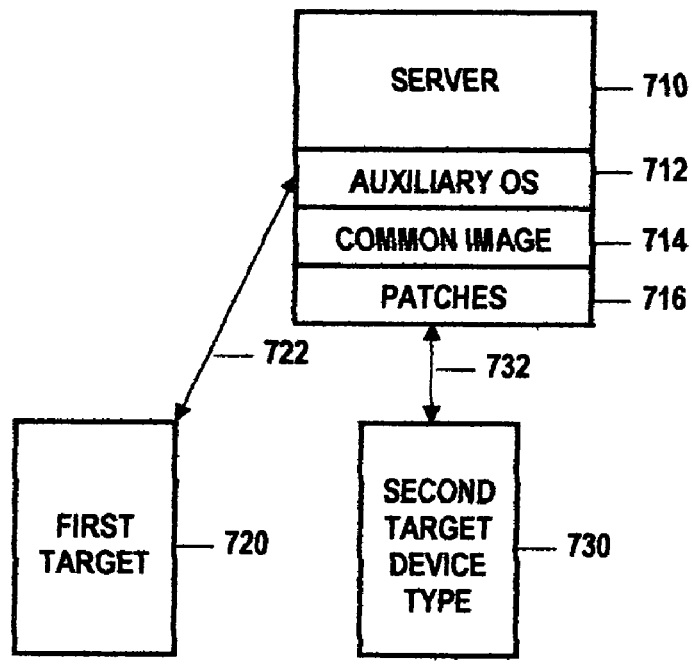
FIG. 7 shows a network with personal computers attached to a server and the associated text describes one process for supplying each with a customized image.

FIG. 7 illustrates the present invention implemented in a network orientation, where a server 710 is coupled by a network connection to a first target device 720 and a second target device 730. The first target device is connected to the server 710 by a network connection indicated by symbol 722 to the server in any conventional manner and the second target device 730 is connected by a network connection 732. The server 710 includes the auxiliary operating system 712, the common image 714, and the patches 716 as well as the configuration determining utility (if used, but not shown in this figure). The number of target devices is unlimited, but only two have been depicted in this FIG. 7 for easy explanation. In this example, the first target device is chosen to be a first type (e.g., an IBM NetVista Model A50) and the second target device is from a different manufacturer (Dell) and is a laptop system, rather than a desktop system. In this way, the first target device requires a first patch and the second target device requires a second patch to be operational.

The operation of this network connected server and target devices allows for various modes of operation. For example, the server may simply download the entire assembly (e.g., like FIG. 4) to each target device, then each target device determines its configuration, determines the appropriate patch(es), applies the patches using a temporary or auxiliary operating system, then installs the image and the patches in its primary partition and begins operating from the primary partition.

An alternate way of handling this common image is for the server to determine the configuration and the necessary patch (es), configure the image with the patch(es) and download only the resulting customized image to the target system.

An additional alternate way of handling this common image is for the server to determine the configuration and the necessary patch(es), and download only the required common image and patches required to the target system to customize the image.

Then, regardless of the source of the operating system, the system has an operating system and proceeds to block where the configuration of the computer is determined. This configuration may be as simple as determining the make of the personal computer (where all versions of a single make have identical configurations), but it also may involve determining the model of the computer as well as other characteristics of the installation (such as peripheral devices and other options, such as the amount of memory and the type of hard drive.)

While the present description discusses four alternatives for patches (called patches 1 through 4 in the foregoing text), in practice there may be any number of patches involved. The system may have tens, if not hundreds, of different patches provided for different system configurations, the number and identity of which patches are dependent on the configuration of the system e.g., the hardware and software that is installed on the system involved. Each patch may be customized for a particular configuration, if desired, or a patch may cover only a part of the required changes for a particular configuration, requiring more than one patch to provide the necessary customization of the image.

Of course, many other modifications and alterations are possible to the preferred embodiment described above, and some of the features and functions of the present invention can be used without the corresponding use of other features. Further, while the present invention has been described in conjunction with the updating method described in the Image Update Patent, the present system and method for deploying an image will be useful without regard to how the initial image will be updated (or even if it will be updated in the future). Further, to the extent that the present invention discloses the use of a common image which is used universally, it is also applicable to a system and method in which a small number of images are used. The use and type of secure partition have been described in some detail, but are not essential for the present invention. The present invention has been described in the context of a personal computer where the sector is 512 bytes, but the present invention may be practiced on another device that has sectors of a different size. Accordingly, the present description of the preferred embodiment should be viewed as merely illustrative of the principles of the present invention and not in limitation thereof, as the invention is defined solely by the following claims. It has been discussed in the foregoing description that there are various ways in which the type and configuration of the structure of the target system may be identified, for example, using configuration-determining software or by having a user enter information regarding the configuration of the target system. Other methods could be used to advantage, such as a table that identifies the configuration based on a deployment plan, either based on address or on user (a listing which identifies that the machine at address 9.19.19.9 is an IBM Model A50 NetVista computer or that John Smith's machine is an IBM T50 ThinkPad laptop computer. If there is an accurate list of what machine is located where, then that list could be used to determine what patches need to be applied.

Of course, many other modifications to the preferred embodiment could be made without departing from the spirit of the present invention and some features could be used without the corresponding use of other features. For example, the present system has been described in the context of two sets of drivers, when the system may have any number of sets of different drivers, each of which can be used either singly or together, depending on the configuration of the computer. In addition, the system has been described in connection with a secure partition; while that is desirable, it is not required. Accordingly, the preferred embodiment has been disclosed with some particularly for the sake of providing an example of the present invention and without intending to limit the invention. The scope of the present invention, for which exclusive rights are sought, is defined solely by the claims that follow.

Having thus described the invention, what is claimed is:

1. A computer-implemented method of deploying an image into a first storage area of a variety of different types of target computer systems comprising the steps of:
   (a) storing, outside the first storage area, a second operating system, recovery software, a common image having a first operating system different from the second operating system and a plurality of delta files, wherein said common image is a sector-based image of a first computer system and the common image is created using the first operating system while the first operating system is operating the first computer system;
   (b) deploying the common image into the first storage area using the recovery software and the second operating system;
   (c) selecting at least one delta file based on at least one characteristic of the target computer system from the plurality of delta files and deploying delta file into the first storage area using the recovery software and the second operating system; and
   (d) executing the deployed first operating system in the first storage area after step (c).

2. The method of claim 1, wherein the first storage area is contained in a first storage device and the area outside the first storage area is contained in a second storage device different from the first storage device and wherein the first and second storage devices are coupled.

3. The method of claim 1, wherein the second operating system is a temporary operating system which is installed when there is no usable operating system present.

4. The method of claim 1 wherein the step of storing of a common image includes the step of storing a plurality of common images, each including an operating system and delta files, and the step of creating a copy of the common image includes the step of selecting one of the common images.

5. The method of claim 1, wherein the first storage area and the area outside the first storage area is coupled to by at least one selected from a local area network, a wide area network, a USB bus and an I/O bus.

6. A computer-implemented method of deploying an image into a first storage area of one of a variety of different types of target computer systems comprising the steps of:
   (a) storing, outside the first storage area, recovery software, a common image having a first operating system and a plurality of delta files wherein said common image is a sector based image of a first computer system and the common image is created using the first operating system while the first operating system is operating the first computer system;
   (b), installing using the first operating system, a second operating system different from the first operating system in an area outside the first storage area;
   (c) creating a custom image based on the common image and at least one delta file selected based on at least one characteristic of the target computer system using the recovery software and the second operating system;
   (d) deploying the custom image into the first storage area using the recovery software and the second operating system;
   (e) executing the deployed first operating system in the first storage area after step (d).

7. The method of claim 6, wherein the first storage area is contained in a first storage device and the area outside the first storage area is contained in a second storage device different from the first storage device and wherein the first and second storage devices are coupled.

8. The method of claim 6, wherein the second operating system, the recovery software, the common image comprising the first operating system and plurality of delta files are stored in the same storage area.

9. The method of claim 6, wherein the second operating system is a temporary operating system which is installed when no usable operating system is present.

10. The method including the steps of claim 6 wherein the step of storing the common image includes the step of storing a plurality of common images, each of the common images including an operating system, and the step of creating a custom image includes the step of selecting at least one common image and using the selected common image with the at least one delta file to create the custom image.

11. The method of claim 6, wherein the first storage area and the area outside the first storage area is coupled to by at least one selected from a local area network, a wide area network, a USB bus and an I/O bus.

12. A data processing apparatus which deploys an image into a primary storage area of a variety of different types of target computer systems comprising:
   (a) a storage device outside the primary storage area of the target computer including a second operating system, recovery software, a common image having a first operating system, and a plurality of delta files, wherein said common image is a sector based image of a first computer system and the common image is created using the first operating system while the first operating system is operating the first computer system;
   (b) the primary storage area of the target computer system storing a copy of the common image having the first operating system different from the second operating system, said copy of the common image being deployed into the primary storage area using the recovery software and the second operating system; and
   (c) at least one delta file from the plurality of delta files selected based on at least one characteristic of the target computer system and being deployed in the first storage area using the recovery software and the second operating system.

13. The apparatus of claim 12, wherein the first storage area is contained in a first storage device and the area outside the first storage area is contained in a second storage device different from the first storage device and wherein the first and second storage devices are coupled.

14. The apparatus of claim 12, wherein the second operating system, the recovery software, the common image comprising the first operating system and plurality of delta files are stored in the same storage area.

15. The apparatus of claim 12, wherein the second operating system is a temporary operating system which is installed when no usable operating system is present.

16. The apparatus of claim 12, wherein at least one delta file is an incremental backup file comprising the changed content since the common image.

17. The apparatus of claim 12, where the first storage area includes a custom image created outside the first storage area based on the common image and at least one delta file and stored as the custom image in the first storage area using the recovery software and second operating system.

18. The apparatus of claim 12 wherein the area outside the first storage area includes a plurality of common images and the system includes a selector which selects at least one common image to be copied and stored in the first storage area.

19. The apparatus of claim 12, wherein the first storage area and the area outside the first storage area is coupled to by at least one selected from a local area network, a wide area network a USB bus, and an I/O bus.

* * * * *